United States Patent
Toyoda et al.

(10) Patent No.: US 9,129,173 B2
(45) Date of Patent: Sep. 8, 2015

(54) DEVICE FOR OPTICALLY READING INFORMATION CODES

(71) Applicants: DENSO WAVE INCORPORATED, Chita-gun, Aichi-pref. (JP); DENSO CORPORATION, Kariya, Aichi-pref. (JP)

(72) Inventors: Chie Toyoda, Nagoya (JP); Toshihiko Tsukada, Nagakute (JP); Satoru Kato, Nisshin (JP); Yoshimi Kitazumi, Chiryu (JP); Kunihiko Ito, Chiryu (JP)

(73) Assignees: DENSO WAVE INCORPORATED, Aichi-pref. (JP); DENSO CORPORATION, Kariya (JP)

( * ) Notice: Subject to any disclaimer, the term of this patent is extended or adjusted under 35 U.S.C. 154(b) by 0 days.

(21) Appl. No.: 14/190,579

(22) Filed: Feb. 26, 2014

(65) Prior Publication Data

US 2014/0239073 A1 Aug. 28, 2014

(30) Foreign Application Priority Data

Feb. 27, 2013 (JP) ................... 2013-037929

(51) Int. Cl.
  *G02B 26/10* (2006.01)
  *G06K 7/10* (2006.01)
  *G06K 19/06* (2006.01)
(52) U.S. Cl.
  CPC .................. *G06K 7/10811* (2013.01)
(58) Field of Classification Search
  USPC ............ 235/454, 455, 462.01–472.03
  See application file for complete search history.

(56) References Cited

U.S. PATENT DOCUMENTS

| 5,748,371 | A | 5/1998 | Cathey, Jr. et al. |
| 6,969,003 | B2 * | 11/2005 | Havens et al. ............ 235/462.22 |
| 7,218,448 | B1 | 5/2007 | Cathey, Jr. et al. |
| 2002/0118457 | A1 | 8/2002 | Dowski, Jr. |
| 2002/0195548 | A1 | 12/2002 | Dowski, Jr. et al. |
| 2003/0057353 | A1 | 3/2003 | Dowski, Jr. et al. |

(Continued)

FOREIGN PATENT DOCUMENTS

| JP | B2-3275010 | 4/2002 |
| JP | A-2012-515359 | 7/2012 |

OTHER PUBLICATIONS

Mukaigawa et al., "Optical sensing technique by engineering optical system, imaging process and signal processing," *Journal of Precision Engineering*, 2011, vol. 77, No. 12, pp. 1104-1108 (w/ partial English translation).

(Continued)

*Primary Examiner* — Tuyen K Vo
(74) *Attorney, Agent, or Firm* — Oliff PLC

(57) ABSTRACT

There is provided a device for reading a code on a subject. The device includes an imaging unit provided with an imaging element, a depth-of-field extending unit, and an optical distorting unit. The imaging unit captures an optical image formed on a light-receiving surface of the subject. The depth-of-field extending unit acquires a focused image regardless of distance to the subject, within a predetermined read-out range. In the optical distorting unit, the captured optical image is distorted such that i) the focused image at a minimum distance in the read-out range includes an overall image of the code and ii) the focused image at a maximum distance in the read-out range is provided so as to allow at least a predetermined number of pixels to be assigned to a unit image of the code.

7 Claims, 8 Drawing Sheets

(56) References Cited

U.S. PATENT DOCUMENTS

| | | |
|---|---|---|
| 2003/0127584 A1 | 7/2003 | Dowski, Jr. et al. |
| 2003/0173502 A1 | 9/2003 | Dowski, Jr. et al. |
| 2004/0004766 A1 | 1/2004 | Dowski, Jr. |
| 2004/0145808 A1 | 7/2004 | Cathey, Jr. et al. |
| 2005/0264886 A1 | 12/2005 | Dowski, Jr. |
| 2006/0011725 A1* | 1/2006 | Schnee ............ 235/454 |
| 2006/0291058 A1 | 12/2006 | Dowski, Jr. |
| 2007/0001105 A1 | 1/2007 | Dowski, Jr. et al. |
| 2007/0076296 A1 | 4/2007 | Dowski, Jr. |
| 2008/0174869 A1 | 7/2008 | Cathey et al. |
| 2008/0296385 A1* | 12/2008 | Vinogradov ........ 235/462.22 |
| 2009/0109535 A1 | 4/2009 | Cathey, Jr. et al. |
| 2009/0200379 A1* | 8/2009 | Kuyper-Hammond et al. ............ 235/462.1 |
| 2010/0176319 A1 | 7/2010 | Nunnink et al. |
| 2012/0161041 A1 | 6/2012 | Nunnink et al. |

OTHER PUBLICATIONS

Zhou et al., "What are Good Apertures for Defocus Deblurring?" *IEEE International Conference on Computational Photography*, 2009, pp. 1-8.

Nagahara et al., "Flexible Depth of Field Photography" In *ECCV*, vol. 4, 2008.

Egawa, "Depth of Field Expansion Technology Using Chromatic Aberration" *KOGAKU, 2011* vol. 40, No. 10, pp. 528-533 (w/ English Abstract).

Levin et al., "4D Frequency Analysis of Computational Cameras for Depth of Field Extension," *MIT CSAIL, TR 2009-019*, 2009.

\* cited by examiner

SUBJECT IMAGE F
(RESTORED IMAGE $F_R$)

CAPTURED IMAGE G
(DISTORTED IMAGE G)

DEVICE FOR OPTICALLY READING INFORMATION CODES

CROSS-REFERENCE TO RELATED APPLICATION

This application is based on and claims the benefit of priority from earlier Japanese Patent Application No. 2013-037929 filed Feb. 27, 2013, the description of which is incorporated herein by reference.

BACKGROUND

1. Technical Field

The present invention relates to a device for optically reading information codes placed on a subject.

2. Related Art

A code reader apparatus is conventionally known that optically reads one-dimensional codes, such as barcodes, and two-dimensional codes, such as QR codes (registered trademark). Extending the range of distances at which read-out can be performed (referred to, hereinafter, as a read-out range) of the code reader apparatus leads to significant improvement in product value of the code reader apparatus. To extend the read-out range, a technology is required for extending depth of field. The depth of field refers to the range of distances on the field side at which the field appears in a focused state.

JP-B-3275010 discloses "an optical system having an extended depth of field". The optical system includes a phase plate optical system and restored image processing performed in frequency space. In the optical system disclosed in JP-B-3275010, the depth of field is extended. An image that is in focus can be acquired over a wide range of distances. However, the code read-out range cannot be extended to its maximum limit by merely extending the depth of field as in the optical system described in JP-B-3275010.

Here, pixel assignment in instances in which codes of the same size are imaged is considered. At near field, the code is projected onto the overall light-receiving surface of an image sensor. However, at far field, the code is projected onto a portion of the light-receiving surface. The number of pixels assigned to a single cell of the code is fewer at far field, compared to that at near field. In other words, a higher resolution is required at far field, compared to near field.

For example, when read-out range, code size, and cell size are determined, an angle of view of an imaging system is determined from the code size at minimum distance. The required resolution is determined from the pixel assignment at maximum distance. A relationship is established in which the number of pixels required in the image sensor is determined from the angle of view and resolution. In actuality, the number of pixels of the image sensor is often determined in advance from the perspective of cost. The maximum distance is often determined by the resolution. Therefore, if the depth of field is merely extended, the read-out distance at near field is restricted by reading screen limitations, such as the code exceeding beyond the reading screen, i.e., the image sensor surface.

In addition, a product catalog for a handheld cordless scanner (product name "SR61ex") manufactured by Intermec Inc. discloses a "code reader" that uses an auto-focus lens to extend the code read-out range. In the method using the auto-focus lens, the distance between the lens and the light-receiving surface of the image sensor is changed by the lens being moved. A code reader that uses the auto-focus lens method requires a driving mechanism for moving the lens. In addition, JP-A-2012-515359 discloses a "code reader" that extends the code read-out range using a variable-focus lens. In the method using the variable-focus lens, the focal distance of the lens is changed. A code reader that uses the variable-focus lens method requires a mechanism for changing the focal distance of the lens.

SUMMARY

Hence, it is desired to provide a code reader apparatus that has a greater read-out range than code reader apparatuses of the past.

To achieve the above-described object, the technology according to a first aspect is a code reader apparatus that reads a code from a subject. The code reader apparatus includes: an imaging unit provided with an imaging element for capturing an optical image formed on a light-receiving surface; a depth of field extending unit for acquiring a focused image regardless of distance to the subject, within a predetermined read-out range; and an optical distorting unit for distorting the captured optical image such that a focused image at a minimum distance of the read-out range includes an overall image of the code and a focused image at a maximum distance of the read-out range is such that at least a predetermined number of pixels are assigned to a unit image of the code.

The optical distorting unit may curve an image surface of the captured optical image such that a focal position in a peripheral portion of the imaging element is closer to the light-receiving surface than a focal position in a center portion of the imaging element, when the distance to the subject is shorter than a predetermined distance.

To achieve the above-described object, the technology according to a third aspect is a code reader apparatus that reads a code from a subject. The code reader apparatus includes: an imaging unit provided with an imaging element for capturing an optical image formed on a light-receiving surface; a wavefront converting unit for converting wavefronts of incident light using a unique conversion function such that an optical image that is not dependent on distance to the subject is captured within a predetermined read-out range; an image processing unit for performing image processing on a captured image using an inverse function of the conversion function to restore the captured image to a focused image of the subject within the predetermined read-out range; and an optical distorting unit that is disposed on a light-incident side of the wavefront converting unit, for distorting the captured optical image such that a restored image at a minimum distance of the read-out range includes an overall image of the code and a restored image at a maximum distance of the read-out range is such that at least a predetermined number of pixels are assigned to a unit image of the code.

The optical distorting unit may curve an image surface of the captured optical image such that a focal position in a peripheral portion of the imaging element is closer to the light-receiving surface than a focal position in a center portion of the imaging element, when the distance to the subject is shorter than a predetermined distance.

The optical distorting unit may be an optical system having at least one lens, and the wavefront converting unit may be a phase modulation surface formed within the optical system.

Hence, in the code reader apparatus, a code read-out range is extended and read-out can be performed from near field to far field by a single code reader apparatus.

BRIEF DESCRIPTION OF THE DRAWINGS

In the accompanying drawings:

FIG. 9A and FIG. 9B are cross-sectional views taken along the optical axis, showing an example of a design for the distortion adding optical system that uses field curvature, in which FIG. 9A shows the field curvature at near field and FIG. 9B shows the field curvature at far field.

DETAILED DESCRIPTION OF THE PREFERRED EMBODIMENTS

An example of an embodiment of the present invention will hereinafter be described in detail with reference to the drawings.

<Configuration of a Code Reader Apparatus>

(Overall Configuration)

First, an overall configuration of a code reader apparatus will be described.

Figure 1:
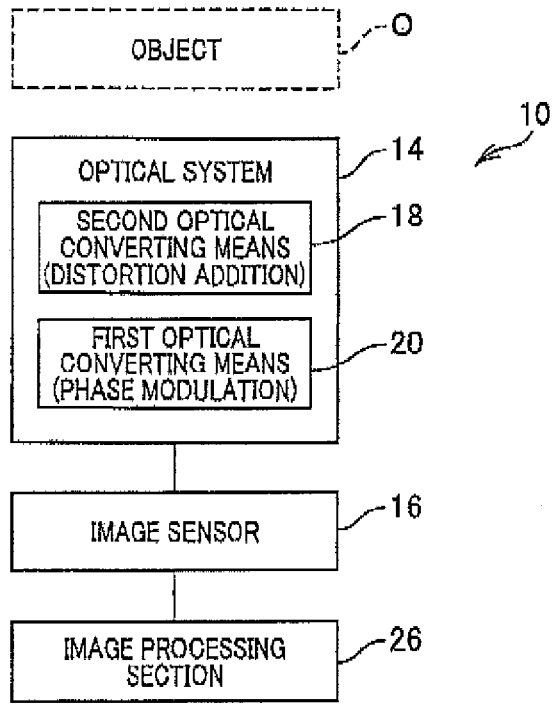
FIG. 1 is a block diagram of a configuration of a code reader apparatus according to an embodiment of the present invention.

FIG. 1 is a block diagram of an example of a configuration of the code reader apparatus according to the embodiment of the present invention. As shown in FIG. 1, a code reader apparatus 10 includes an optical system 14, an image sensor 16, and an image processing section 26. The optical system 14 forms an optical image of an object O. The image sensor 16 captures the formed optical image. The image processing section 26 performs image processing on the captured image. The optical system 14, the image sensor 16, and the image processing section 26 are disposed within a case (not shown). The case has a window portion. Light scattered by the object O passes through the window portion and is incident on the optical system 14. The optical system 14 includes a phase modulation element 20 as a wavefront converting means or a wavefront converting unit. The optical system 14 also includes a distortion adding optical system 18 as an optical distorting means or an optical distorting unit. Here, the object O is a read-out subject to which a code has been added.

In the above-described code reader apparatus 10, even when the phase modulation element 20 converts the wavefront of light incident on the optical system 14 and the distance to the object O is changed, images that are blurred in the same manner are captured. In addition, a focused image (image from which blurring has been removed) is restored by the image processing section 26 performing image processing, such as inverse transform, on the captured image. In a predetermined range of distances (read-out range), imaging and restoration that are not dependent on the distances can be performed. As a result, the depth of field is extended. The above-described method for extending the depth of field is referred to as wavefront coding. The principle of depth of field extension will be described hereafter.

In addition, in the above-described code reader apparatus 10, the distortion adding optical system 18 adds distortion to the optical image captured by the image sensor 16. The distortion adding optical system 18 distorts the optical image such that a restored image captured at the minimum distance of the read-out range includes a complete image of the code. In other words, the distortion adding optical system 18 distorts the optical image such that the overall code is captured within the recovered image captured at the minimum distance. Furthermore, the distortion adding optical system 18 distorts the optical image such that at least a predetermined number of pixels are assigned to a unit image (single-cell image) of the code in a recovered image captured at the maximum distance of the read-out range. In other words, the distortion adding optical system 18 distorts the optical image such that a single cell of the code is resolved even at the maximum distance.

The image distorted by the distortion adding optical system 18 is corrected to an image that has no distortion by digital processing performed by the image processing section 26. As a result of the above-described distortion addition and distortion correction, the field of view at near field is extended. In addition, pixel assignment at far field is ensured. The read-out range is essentially extended. In other words, as a result of the distortion adding optical system 18 being included in addition to the phase modulation element 20, an issue that cannot be solved by simply extending the depth of field can be solved. Extending the field of view and ensuring pixel assignment will be described in detail hereafter.

(Configuration of an Optical System)

Next, a configuration of the optical system in the code reader apparatus 10 will be described.

Figure 2A:
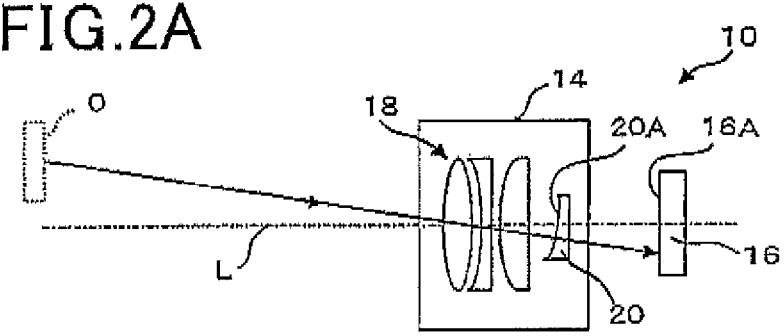
FIG. 2A is a cross-sectional view taken along an optical axis, showing an example of an optical system in the code reader apparatus according to the embodiment of the present invention.

FIG. 2A is a cross-sectional view taken along an optical axis, showing an example of the optical system of the code reader apparatus 10 according to the embodiment of the present invention.

As shown in FIG. 2A, the distortion adding optical system 18, the phase modulation element 20, and the image sensor 16 are disposed in order from the object O side, along an optical axis L. In the example shown in FIG. 2A, a three-dimensional phase plate which serves as a phase modulation plate is used as the phase modulation element 20. The three-dimensional phase plate has a unique recess and projection (thickness distribution) in the optical axis direction. The unique recess and projection of the phase plate is actualized by, for example, a phase modulation surface 20A having a curved surface. The phase modulation element 20 is disposed behind the distortion adding optical system 18 (aperture position) with the phase modulation surface 20A facing the distortion adding optical system 18 side.

The light incident on the optical system 14 passes through the distortion adding optical system 18 and the phase modulation element 20. The light then forms an image on a light-receiving surface 16A of the image sensor 16. As described above, the captured image of the object O becomes a degraded image to which distortion is added by the distortion adding optical system 18 and that is made out-of-focus by the phase modulation element 20.

An image sensor that captures an optical image by photoelectric conversion or the like can be used as the image sensor 16. For example, a charge coupled device (CCD) image sensor or a complementary metal oxide semiconductor (CMOS) image sensor can be given as the image sensor.

The distortion adding optical system 18 is merely required to be designed such that the recovered image includes the overall image of the code at the minimum distance of the read-out range and a predetermined number of pixels are assigned to a unit image (single-cell image) of the code in the recovered image at the maximum distance. The distortion adding optical system 18 may be configured by a single optical element. Alternatively, the distortion adding optical system 18 may be configured by a group of optical elements, such as a combination lens. According to the present embodiment, as the distortion adding optical system 18, a distortion optical system is used that distorts an image by compressing a peripheral portion of the image. As the distortion optical system, a compression optical system, such as a "fisheye lens", can be used. The compression optical system increasingly compresses the image in a concentric circular manner from a center portion towards the outer side.

In the optical system shown in FIG. 2A, the phase plate is used as the phase modulation element 20. However, the phase modulation element 20 is merely required to be an optical element that provides a function for converting the wavefront of incident light (phase modulation function). An optical element (such as a cubic phase plate) of which the thickness in the optical axis direction changes may be used as the phase modulation element 20. Alternatively, for example, an optical element (such as a refractive index distribution-type phase modulation element) of which the refractive index changes or a liquid crystal element (such as a liquid crystal spatial phase modulation element) capable of phase modulation, may be used. In addition, for example, an optical element (such as a phase modulation hybrid lens) of which the thickness and the refractive index changes depending on a coating applied to a lens surface may be used.

Figure 2B:
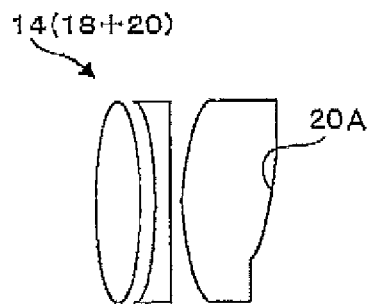
FIG. 2B is a cross-sectional view taken along the optical axis, showing an example of an optical system including a phase modulation plate.

Furthermore, the phase modulation surface 20A serving as the wavefront converting means may be formed integrally with the distortion adding optical system 18. FIG. 2B is a cross-sectional view taken along the optical axis, showing an example of an optical system including the phase modulation surface. In the examples shown in FIG. 2A and FIG. 2B, the distortion adding optical system 18 is a combination lens composed of a plurality of lenses. The phase modulation surface 20A is formed on one of the lens faces of the distortion adding optical system 18 on the light-exiting side. As a result of the phase modulation surface 20A being integrally formed with the distortion adding optical system 18, the number of components can be reduced. In addition, optical axis alignment of the phase modulation element is not required.

(Conversion Characteristics of the Optical System)

Next, conversion characteristics of the optical system will be described.

Figure 3A:
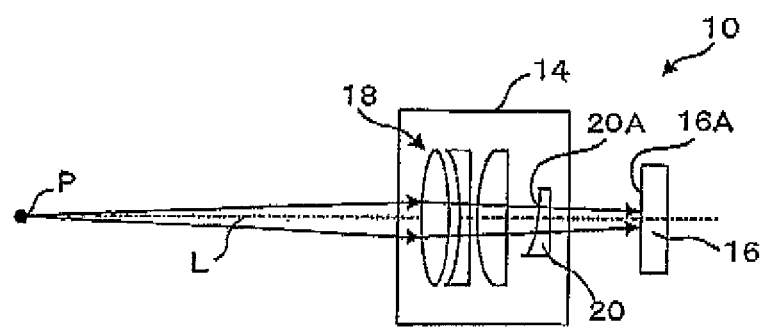
FIG. 3A and FIG. 3B are explanatory diagrams of a method for acquiring a point spread function (PSF)
Figure 3B:
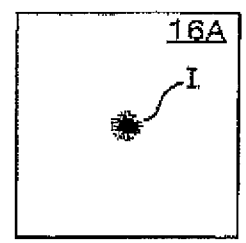

FIG. 3A and FIG. 3B are explanatory diagrams of a method for acquiring a point spread function (PSF). In wavefront coding, the PSF is used to express conversion characteristics of the optical system. The PSF is a function indicating a degree of spreading in relation to a point light source in the optical system. In other words, the PSF expresses how the point light source is blurred in an image, when the image of the point light source is captured. Still in other words, the PSF expresses the manner in which the point light source is blurred.

As shown in FIG. 3A, a point light source P is captured by the image sensor 16 using the optical system 14 of the code reader apparatus 10. As shown in FIG. 3B, a map I corresponding to the point light source P is formed on the light-receiving surface 16A of the image sensor 16. A PSF unique to the optical system 14 is acquired from the map I. The acquired PSF is stored as a control value in a storage section 30 of a control device 24, described hereafter. According to the present embodiment, the PSF is processed as a function that is not dependent on distance. Strictly speaking, the PSF changes depending on the distance to the point light source. However, in the read-out range, the PSF can be processed as a function that is not dependent on distance.

(Configuration of a Control System)

Next, a configuration of a control system in the code reader apparatus 10 will be described.

Figure 4A:
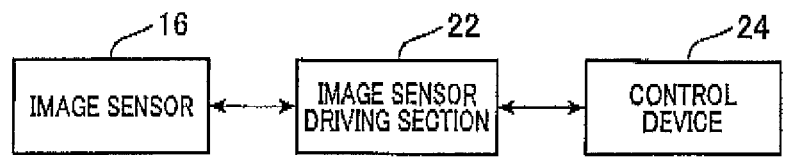
FIG. 4A is a block diagram of a configuration of a control system in the code reader apparatus according to the embodiment of the present invention.
Figure 4B:
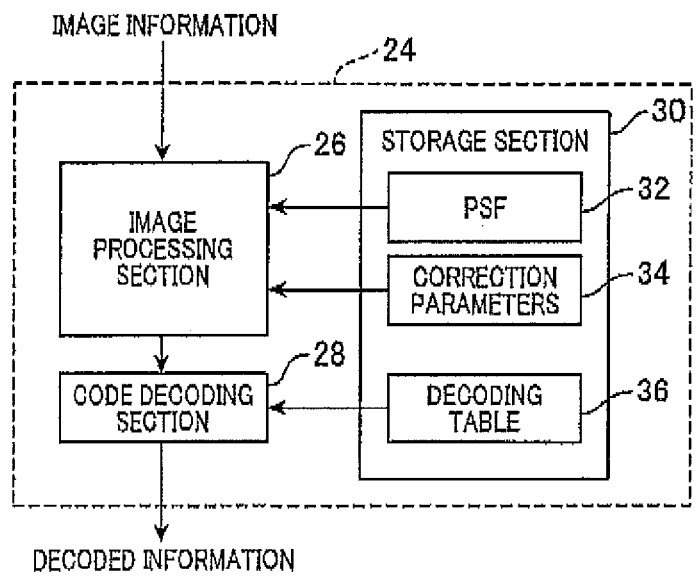
FIG. 4B is a functional block diagram of a control device.

FIG. 4A is a block diagram of the configuration of the control system in the code reader apparatus 10 according to the embodiment of the present invention. FIG. 4B is a functional block diagram of the control device 24.

As shown in FIG. 4A, the code reader apparatus 10 includes an image sensor driving section 22 and the control device 24. The image sensor driving section 22 drives the image sensor 16. The control device 24 controls the image sensor driving section 22. For example, the image sensor driving section 22 drives each section of the image sensor 16 based on control signals from the control device 24. In addition, the image sensor driving section 22 acquires analog image signals from the image sensor 16. The image sensor driving section 22 then performs processing, such as converting the analog image signals to digital image signals (analog/digital [A/D] conversion), and outputs image information on the captured optical image to the control device 24. The control device 24 decodes the code based on the acquired image information and outputs decoded information.

As shown in FIG. 4B, the control device 24 includes the image processing section 26, a code decoding section 28, and the storage section 30. The storage section 30 stores therein a PSF 32, correction parameters 34, and a decoding table 36. The PSF 32 is used for restoration of a focused image. The correction parameters 34 are used for distortion correction. The decoding table 36 is used for code decoding.

The image processing section 26 reads out the PSF 32 of the optical system 14 from the storage section 30. The image processing section 26 then performs image processing such as to perform inverse transform on the captured image. The image processing section 26 then restores the captured image to a focused image from which blurring has been removed. In addition, the image processing section 26 reads out the correction parameters 34 for distortion correction. The image processing section 26 then performs image processing such as to perform distortion correction on the captured image, thereby acquiring an undistorted image. The restoration process and the distortion correction process may be performed in any order. Image information related to an undistorted, focused image is acquired by these processes.

The code decoding section 28 extracts a code image from the image that has undergone image processing. The code decoding section 28 then performs a decoding process for decoding the code. The code decoding section 28 performs the decoding process based on the decoding table 36 read out from the storage section 30. The code decoding section 28 outputs decoded information acquired through the decoding process. For example, when the code is a barcode, a digit sequence composed of 0s and 1s corresponding to the decoded barcode is produced. Alternatively, a character string corresponding to the digit sequence is produced.

<Functions of the Code Reader Apparatus>

Next, functions of the code reader apparatus will be described. As described above, the code reader apparatus 10 according to the present embodiment includes a "depth of field extending function", a "field of view extending function", and a "pixel assignment ensuring function". Each function will be described hereafter.

(Depth of Field Extending Function)

First, the "depth of field extending function" will be described in further detail.

Figure 5:
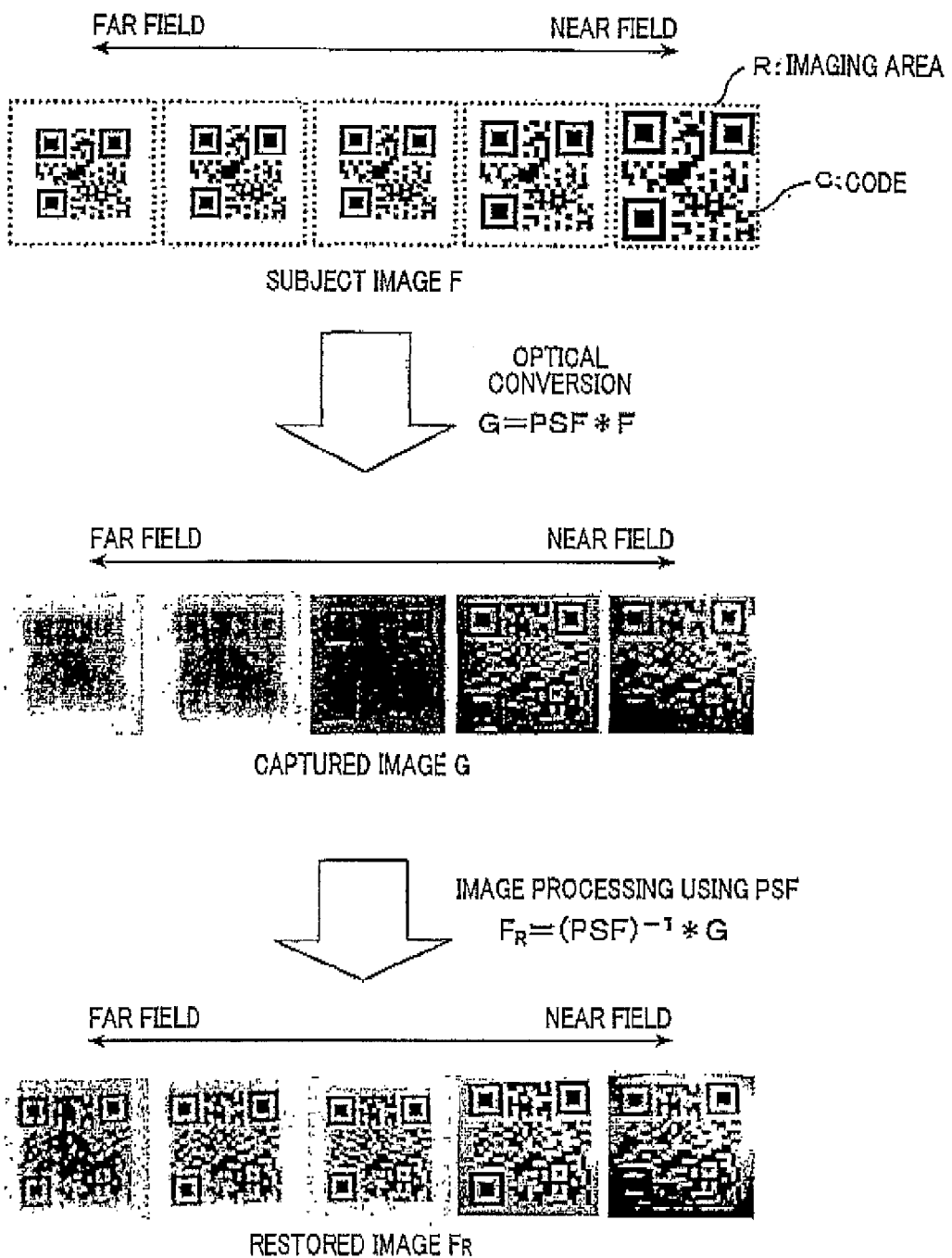
FIG. 5 is an explanatory diagram for explaining the principle of depth of field extension.

FIG. 5 is an explanatory diagram for explaining the function for extending the depth of field. According to the present embodiment, the depth of field is extended using wavefront coding, as described above.

Here, the principle of wavefront coding will be briefly described. An instance will be described in which a subject image F is optically converted to a captured image G by the optical system 14 and restored to a restored image $F_R$ by image processing. The optical system 14 has a PSF. In the optical conversion from the subject image F to the captured image G, approximation by convolution using the PSF is performed, as expressed by a following expression:

$$G = PSF * F \text{ (* indicates convolution)}$$

In addition, in the image processing for restoring the captured image G to the restored image $F_R$, approximation by convolution using an inverse function $(PSF)^{-1}$ of the PSF is performed, as expressed by a following expression. In other words, a filtering process equivalent to inverse transform of change in an optical transmission function (OTF) performed by the optical system 14 is performed.

$$F_R = (PSF)^{-1} * G \text{ (* indicates convolution)}$$

As shown in FIG. 5, when an image of a subject to which a code C has been added is captured, the code C occupies a portion of an imaging area R when the subject is present at a far distance (far field). When the subject is present at a near distance (near field), the code C occupies substantially the overall imaging area R. Hereafter, the imaging area R is referred to as a screen. When wavefront coding is not used, a blurred image is captured at near field and at far field when the subject leaves a focus position. The manner of blurring changes depending on the distance (amount of misalignment) from the focus position to the subject.

According to the present embodiment in which wavefront coding is used, within the predetermined read-out range, a captured image G having the same manner of blurring is captured regardless of the distance to the subject, as a result of the above-described optical conversion. In addition, according to the present embodiment, the PSF of the optical system 14 is not dependent on distance. Therefore, within the predetermined read-out range, the captured image G is restored to the focused recovered image $F_R$ regardless of the distance to the subject, as a result of the above-described image processing.

(Field of View Extending Function)

Next, the "field of view extending function" will be described in further detail.

Figure 6A:
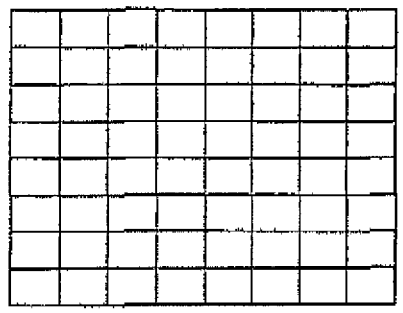
FIG. 6A to FIG. 6C are explanatory diagrams for explaining an operation of a distortion adding optical system.
Figure 6B:
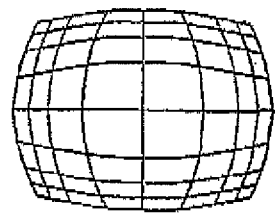
Figure 6C:
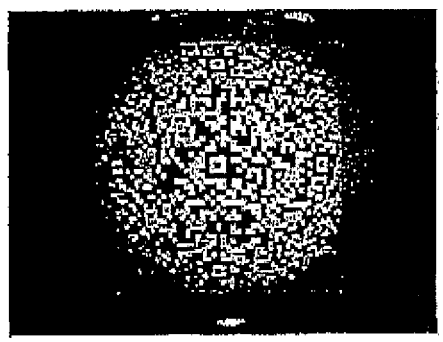
Figure 7:
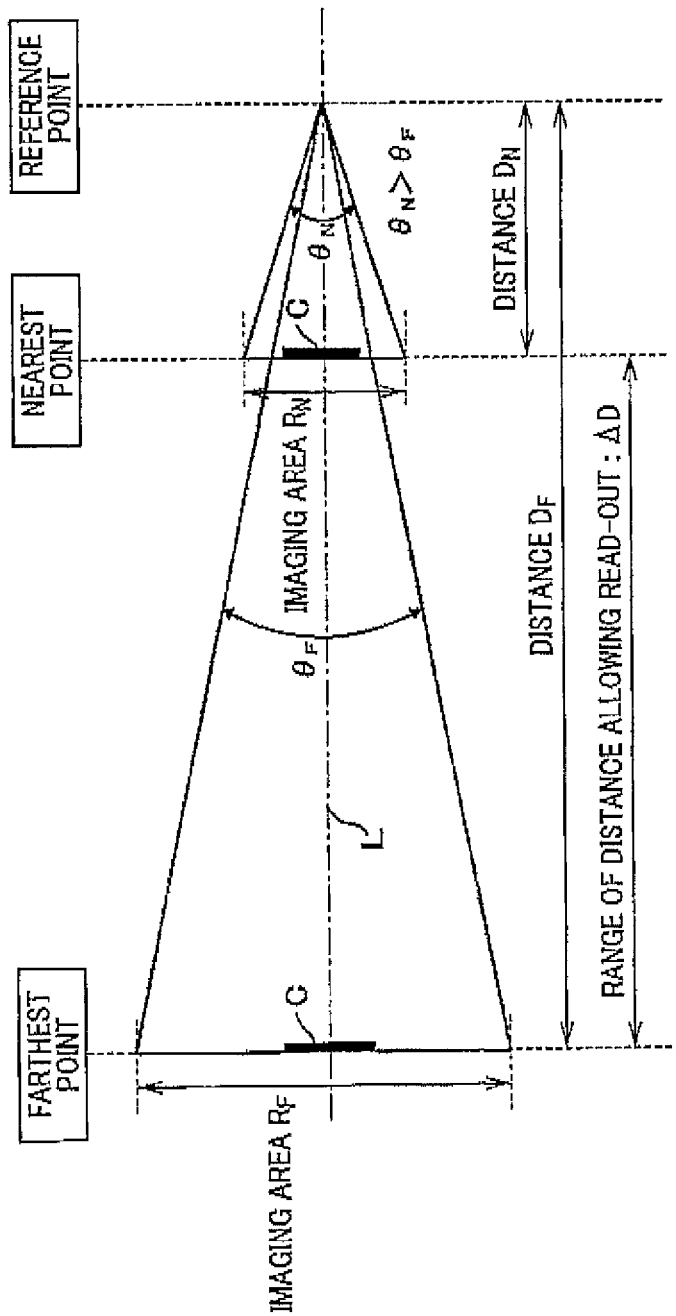
FIG. 7 is a schematic diagram for explaining field of view extension performed by the distortion adding optical system.

FIG. 6A to FIG. 6C are explanatory diagrams for explaining an operation of the distortion adding optical system 18. FIG. 7 is a schematic diagram for explaining the field of view extending function provided by the distortion adding optical system 18.

The distortion adding optical system 18 distorts the optical image such that a recovered image captured at the minimum distance of the read-out range includes the overall image of the code. The subject image F shown in FIG. 6A is captured as a distorted image G in which compression is greater in the peripheral portion than in the center portion of the image, as shown in FIG. 6B. The distortion is weak in the peripheral portion. The distortion is weak in the center portion. For example, when a QR code (registered trademark) is read at near field, the distorted image G shown in FIG. 6C is captured.

As is clear from FIG. 6C, as a result of the image being distorted, the overall code can be captured within the screen even at near field. As shown in FIG. 6A and FIG. 6B, as a result of the distortion correction process after imaging, the distorted image G is restored to the undistorted restored image $F_R$. In other words, the image of the compressed peripheral portion is restored and returned to an undistorted image.

As shown in FIG. 7, as a result of the depth of field being extended, a restored image that is in focus can be obtained regardless of the distance to the subject, within a read-out range D. The read-out range D is from minimum distance $D_N$ to maximum distance $D_F$. Here, a "reference point" refers to an "aperture position" at which the phase modulation surface 20A of the phase modulation element 20 is disposed.

When the subject is captured at a nearest point that is at the minimum distance $D_N$, the code C added to the subject fits within the imaging area as a result of the distortion adding optical system 18 adding distortion. A restored image including the code image can be acquired. In other words, as a result of the distortion adding optical system 18 adding distortion, the field of view at the nearest point is extended. Wide-angle imaging at an angle of view $\theta_N (> \theta_F)$ can be performed. For example, the field of view is extended by 1.4 times. Expansion of the field of view at the nearest point essentially extends the depth of field. The angle of view $\theta_F$ is the angle of view at a farthest point that is at the maximum distance $D_F$.

(Pixel Assignment Ensuring Function)

Next, the "pixel assignment ensuring function" will be described in further detail with reference to FIG. 7.

As described above, the distortion adding optical system 18 compresses more strongly the peripheral portion of the image than the center portion. At near field, the code C occupies substantially the overall surface of the screen. Therefore, assignment of the number of pixels for a unit image (single cell) of the code C increases. On the other hand, at far field, the code C occupies only a portion of the screen. Therefore, pixel assignment for a single cell of the code C decreases. When the pixel assignment for a single cell of the code C decreases, the image is easily affected by the distortion adding optical system 18. In other words, restoration to an undistorted code image is difficult even in the center portion that is less distorted than the peripheral portion.

In light of the above-described issue, the distortion adding optical system 18 distorts the optical image such that at least a predetermined number of pixels are assigned to a unit image (single cell) of the code C in the restored image captured at the maximum distance $D_F$ of the read-out range. The optical image is distorted such that the pixel assignment for a single cell of the code C is greater than the predetermined number of pixels, at the farthest point that is at the maximum distance $D_F$. For example, the pixel assignment for a single cell of the code C is two pixels or more. As a result, a single cell of the code C is resolved even at the farthest point.

At far field as well, the code C occupies the center portion of the screen. Therefore, the distortion adding optical system 18 may be designed such that the resolution is high in the center portion and the resolution is low in the peripheral portion. As a result of this design, the pixel assignment for a single cell of the code C can be made greater than the predetermined number of pixels at the farthest point.

Figure 9A:
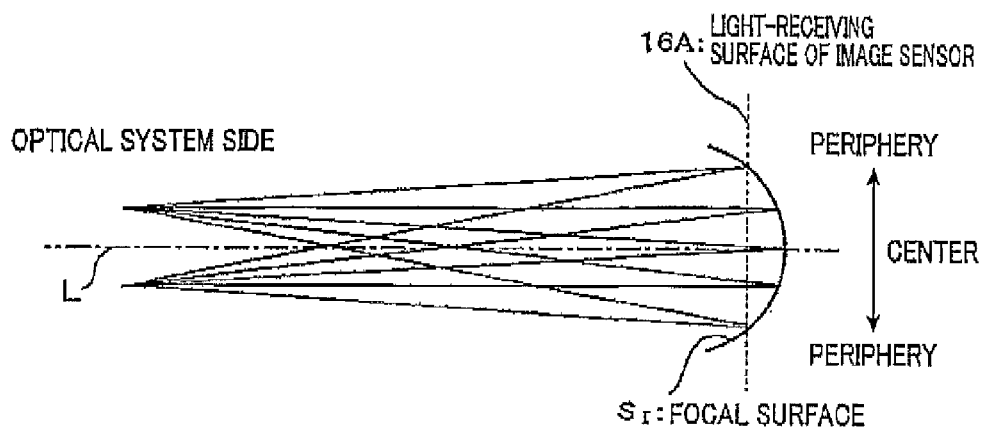
Figure 9B:
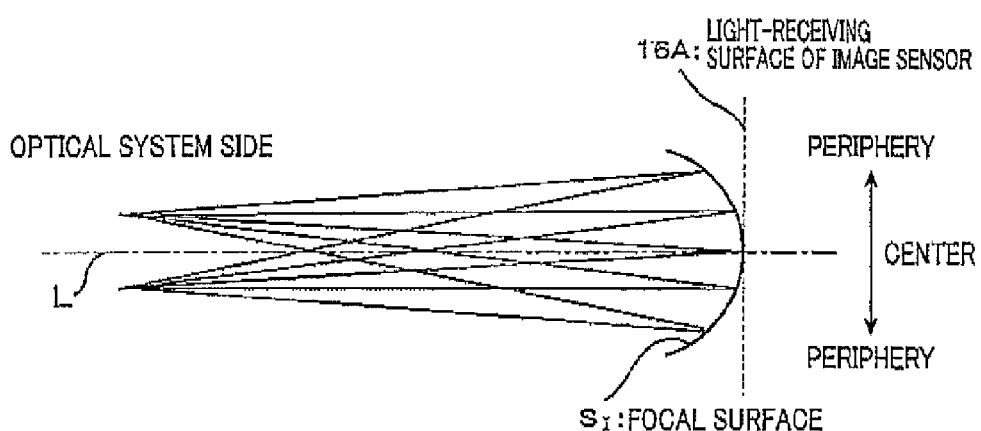

In addition, as shown in FIG. 9A and FIG. 9B, when the distortion adding optical system 18 is used, because focal positions differ between the center portion and the peripheral portion of the field of view, a phenomenon referred to as "field curvature" occurs. In field curvature, a focal surface $S_f$ (image surface of the optical image) becomes curved. The distortion adding optical system 18 may be designed such as to actively take advantage of the field curvature. This design will be described in detail hereafter.

At near field, as shown in FIG. 9A, the focal position at the peripheral portion is closer to the light-receiving surface 16A of the image sensor 16 than the focal position at the center portion. In other words, focus is not aligned at the light-receiving surface 16A in the center portion. Rather, focus is aligned at the light-receiving surface 16A in the peripheral portion. The amount of information in the peripheral portion is reduced as a result of compression by the distortion adding optical system 18. Because focus is aligned at the light-receiving surface 16A in the peripheral portion, restoration of the image in the peripheral portion and decoding of the code are facilitated. At far field, as shown in FIG. 9B, the focal position is shifted towards the optical system side. The curved focal surface $S_f$ is also shifted towards the optical system side. Focus is not aligned at the light-receiving surface 16A in the peripheral portion. Rather, focus is aligned at the light-receiving surface 16A in the center portion.

EXAMPLES

An experiment for reading a code having a cell size of 1.0 mm was performed using a general-purpose image sensor. Whereas the code could be read at a range of 200 mm or more and 400 mm or less using a conventional optical system, it was found that the code could be read at a range of 120 mm or more and 1200 mm or less using the optical system according to the present embodiment. The read-out range (distance from the aperture position) changes depending on cell size and optical system design.

(Combining Functions)

Figure 8A:
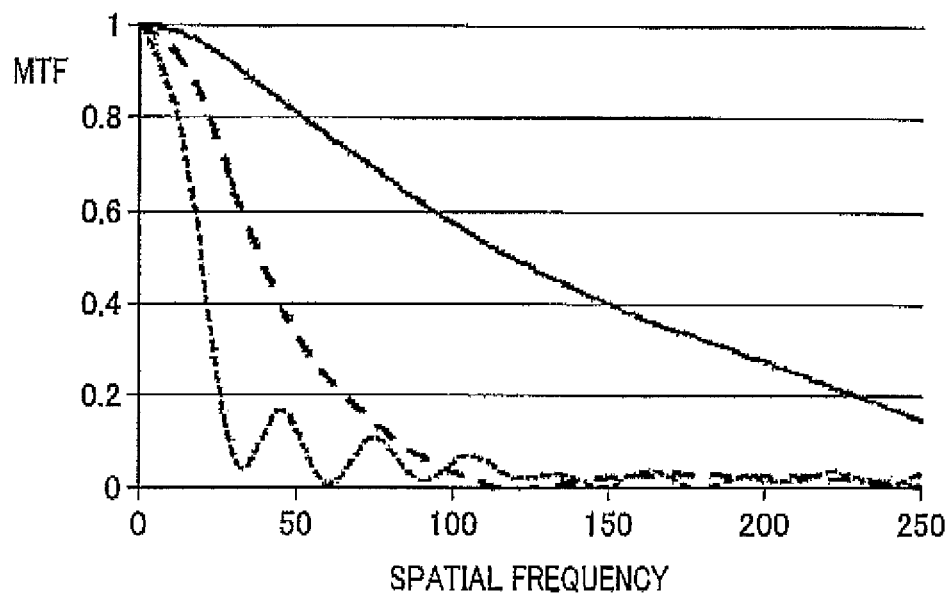
FIG. 8A and FIG. 8B are graphs indicating differences in MTF response depending on the presence of a phase modulation element.
Figure 8B:
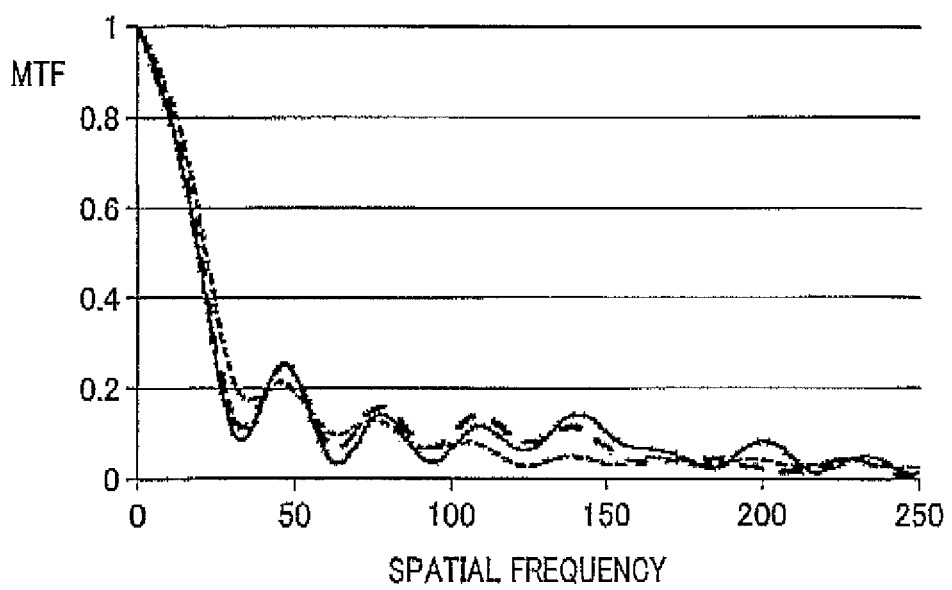

Next, combination of the "depth of field extending function", "field of view extending function", and "pixel assignment ensuring function" will be described. FIG. 8A and FIG. 8B are graphs indicating differences in modulation transfer function (MTF) response depending on the presence of the phase modulation element. FIG. 8A is a graph indicating the MTF response when a phase modulation element is not present. FIG. 8B is a graph indicating the MTF response when a phase modulation element is inserted. The vertical axis indicates normalized MTF value. The horizontal axis indicates spatial frequency (unit: cycle/mm). The configuration of the optical system is as shown in FIG. 2A.

The MTF is an indicator indicating the imaging performance of the optical system. The distance to the subject is indicated as increasing in the order of the solid line, to the rough dotted line, to the fine dotted line. As shown in FIG. 8A, in an instance in which the phase modulation element 20 is not disposed in the aperture position of the distortion adding optical system 18, the MTF response decreases as the distance to the subject increases. This indicates that the imaging performance of the optical system 14 changes depending on the distance to the subject.

Conversely, as shown in FIG. 8B, in an instance in which the phase modulation element 20 is disposed in the aperture position of the distortion adding optical system 18, the MTF response is substantially constant regardless of the distance to the subject. This indicates that the imaging performance of the optical system 14 is constant regardless of the distance to the subject. From these results, it is found that MTF distribution of the distortion adding optical system 18 is made uniform by the phase modulation element 20. Images that are blurred in the same manner can be obtained. In addition, the depth of field can be extended.

As described above, according to the present embodiment, a focused restored image is acquired regardless of the distance to the subject. In other words, the depth of field is extended and the read-out range is extended. In addition, according to the present embodiment, distortion is added to the captured optical image depending on the read-out range. As a result of distortion being added, the field of view at near field is extended such that the restored image that has been captured at the minimum distance and restored includes the overall image of the code. In addition, as a result of distortion being added, a predetermined number of pixels are assigned to each cell of the code in the restored image that has been captured at the maximum distance and restored. Therefore, read-out from near field to far field can be performed with a single code reader apparatus.

Variation Examples

The configuration of the code reader apparatus described in the above-described embodiment is an example. The configuration may be modified without departing from the spirit of the present invention.

For example, according to the above-described embodiment, an instance in which the depth of field is extended by wavefront coding is described. However, the depth of field may be extended by other methods. For example, as the method for extending the depth of field, coded aperture, focus sweep, color aberration, microlens, and the like can be given. These are known methods described in detail in various documents. Regarding coded aperture and focus sweep, refer to Yasuhiro Mukaikawa, et al., "Optical sensing technology by modification of optical systems, imaging process, and signal processing", Journal of the Japan Society for Precision Engineering, Vol. 77, No. 12, 2011.

In coded aperture, not only is the light quantity adjusted by the aperture in the imaging system, the PSF of the imaging system is encoded. In an ideal geometric optical system, the shape of the aperture is equivalent to the shape of the PSF in the image. Therefore, the PSF of the imaging system can be controlled by the aperture pattern. To stably restore images, an aperture shape having broadband frequency characteristics with no zero intersection is proposed. Details are described in documents such as Zhou, C., Nayar, "What are good apertures for defocus deblurring?", International Conference of Computational Photography, San Francisco, U.S. (2009).

In focus sweep, multiple exposure of an image at each point is performed while changing the position of the image sensor during exposure (focus sweeping). As a result, a PSF that is not dependent on distance is obtained. Details are described in documents such as Hajime Nagahare, Sujit Kuthirummal, Changyin Zhou, Shree K, Nayar, "Flexible Depth of Field Photography", Proc. European Conf. Computer Vision, No. LNCS 5305, pp. 60-73, 2008. 10.

In chromatic aberration, the depth of field is extended by a special optical lens that has increased chromatic aberration, a color filter array, and dedicated signal processing. Details are described in documents such as Egawa, et al., "Depth of Field Expansion Technology Using Chromatic Aberration", Kougaku (Optics) 40(10), 528-533, 2011-10-10, The Optical Society of Japan, a division of The Japan Society of Applied Physics.

In the microlens method, the depth of field is extended by an imaging system having a special lens that is a combination of a plurality of lenses having differing focal distances. Details are described in documents such as Levin, A., Hasinoff, S., Green, P., DuRand, F., and Freeman, W., 2009, "4D frequency analysis of computational cameras for depth of field extension", MIT CSAIL TR 2009-019.

In addition, the code added to the read-out subject may be any of one-dimensional codes, such as barcodes, and two-dimensional codes, such as QR codes (registered trademark).

The present invention may be embodied in several other forms without departing from the spirit thereof. The embodiment and modification described so far are therefore intended to be only illustrative and not restrictive, since the scope of the invention is defined by the appended claims rather than by the description preceding them. All changes that fall within the metes and bounds of the claims, or equivalents of such metes and bounds, are therefore intended to be embraced by the claims.

What is claimed is:

1. A device for reading an information code from a subject, comprising:
    configured to capture an optical image formed on a surface of the subject, by receiving light reflected from the surface;
    a depth-of-field extending member configured to acquire, from the captured optical image, a focused image independently of a distance to the subject, within a predetermined read-out range; and
    an optical distorting member configured to distort the captured optical image such that i) the focused image at a minimum distance in the read-out range includes an overall image of the code and ii) the focused image at a maximum distance in the read-out range is provided so as to allow at least a predetermined number of pixels to be assigned to a unit image of the code.

2. The device of claim 1, wherein
the optical distorting member curves an image surface of the captured optical image such that a focus position in a peripheral area of the imaging element comes closer to the light-receiving surface than a focus position in a central area of the imaging device when a distance from the imaging element to the subject is shorter than a predetermined distance.

3. The device of claim 1, wherein
the depth-of-field extending member comprises:
    an optical wavefront converting member configured to convert, with a conversion function, a wavefront of incident light showing the optical image so as to allow the captured optical image to be independent of the distance to the subject within the predetermined read-out range, and
    image processing unit configured to process the captured and wavefront-converted optical image based on an inverse function of the conversion function, such that the focused image is restored from the captured and wave-converted image within the predetermined read-out range, wherein
the optical distorting member arranged on an optical incidence side of the) optical wavefront converting member distorts, as the focused image, a restored image restored by the image processing unit such that i) the restored image at a minimum distance in the read-out range includes an overall image of the code and ii) the restored image at a maximum distance in the read-out range is provided so as to allow at least a predetermined number of pixels to be assigned to a unit image of the code.

4. The device of claim 3, wherein
the optical distorting member an image surface of the captured optical image such that a focus position in a peripheral area of the imaging element comes closer to the light-receiving surface than a focus position in a central area of the imaging device when a distance from the imaging element to the subject is shorter than a predetermined distance.

5. The device of claim 3, wherein
the optical distorting member is an optical system including at least one lens, the optical system having the conversion function, and
the wavefront converting member an optical phase modulation element having a phase modulation surface which receives the light transmitted through the optical distorting member.

6. The device of claim 3, wherein
the image processing unit comprises at least one of:
    an image processing section i) processing restoring the focused image based on the inverse function and ii) correcting distortion of the restored focused image, and
    a code decoding section i) extracting a code image from the focused image and ii) decoding the code image to code information.

7. The device of claim 4, wherein
the optical distorting member is an optical system including at least one lens, the optical system having the conversion function, and
the wavefront converting member is an optical phase modulation element having a phase modulation surface which receives the light transmitted through the optical distorting member.

* * * * *